(12) United States Patent
Lukas et al.

(10) Patent No.: US 7,839,502 B2
(45) Date of Patent: Nov. 23, 2010

(54) METHOD FOR THE WAVELENGTH CALIBRATION OF A SPECTROMETER

(75) Inventors: Rene Lukas, Graz (AT); Gudrun Schappacher, Graz (AT)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 355 days.

(21) Appl. No.: 12/125,089

(22) Filed: May 22, 2008

(65) Prior Publication Data

US 2008/0297796 A1 Dec. 4, 2008

(30) Foreign Application Priority Data

May 30, 2007 (EP) .................................. 07109191

(51) Int. Cl.
*G01J 3/02* (2006.01)
*G01J 3/28* (2006.01)
(52) U.S. Cl. ...................... 356/326; 702/104
(58) Field of Classification Search .................. 356/326, 356/328
See application file for complete search history.

(56) References Cited

U.S. PATENT DOCUMENTS

| 4,692,883 A | 9/1987 | Nelson et al. |
| 4,866,644 A | 9/1989 | Shenk et al. |
| 5,347,475 A | 9/1994 | Taylor et al. |
| 5,771,094 A | 6/1998 | Carter et al. |
| 6,700,661 B1 | 3/2004 | Cadell et al. |

FOREIGN PATENT DOCUMENTS

| EP | 0692703 A1 | 1/1996 |
| EP | 0800066 B1 | 10/1997 |
| EP | 1319176 B1 | 6/2003 |
| EP | 1371957 A1 | 12/2003 |
| WO | WO9732187 A1 | 9/1997 |
| WO | WO9841825 A1 | 9/1998 |
| WO | WO03076883 A2 | 9/2003 |

*Primary Examiner*—F. L Evans

(57) ABSTRACT

Methods for wavelength calibration of spectrometers are provided which achieve better calibration accuracies than conventional peak search methods. The methods are based on the principle of a stepwise relative shift of corresponding measured-value blocks of a model and calibration spectrum where a correlation value is calculated for each shift step. A shift value is determined for each measured-value block at which the correlation value reaches an optimum. A value pair consisting of a position marker of the measured-value block and the associated shift value is determined for each measured-value block. These value pairs represent the design points for fitting to a suitable assignment function. Coefficients obtained in this manner can be used directly as coefficients of a wavelength assignment or be combined with the coefficients of an existing first wavelength assignment in that they for example replace or are offset against the coefficients of an existing first wavelength assignment.

18 Claims, 3 Drawing Sheets

Fig. 2

$$R_{xy}(\tau) = \lim_{T_F \to \infty} \frac{1}{T_F} \int_{-T_F/2}^{T_F/2} x(t) \cdot y(t+\tau) dt$$

Fig. 4

$$\text{Kor}_e(X,Y) := \varrho_e(X,Y) := \frac{\sum_{i=1}^{n}(x_i - \bar{x})(y_i - \bar{y})}{\sqrt{\sum_{i=1}^{n}(x_i - \bar{x})^2} \cdot \sqrt{\sum_{i=1}^{n}(y_i - \bar{y})^2}}$$

Fig. 5

$$\bar{x} = \frac{1}{n} \cdot \sum_{i=1}^{n} x_i$$

Fig. 6

$$\bar{y} = \frac{1}{n} \cdot \sum_{i=1}^{n} y_i$$

METHOD FOR THE WAVELENGTH CALIBRATION OF A SPECTROMETER

BACKGROUND OF THE INVENTION

The invention concerns methods for the wavelength calibration of spectrometers. In particular, the invention concerns methods for the wavelength calibration of secondary spectrometers by users where the secondary spectrometers are substantially identical in construction to a primary spectrometer that is available in the factory and serves as a standard for the wavelength calibration. The methods according to the invention can be used for the wavelength calibration of spectrometers which have a detector array as a detection unit and data processing devices for storing and processing data.

Spectrometers are in general devices for displaying a spectrum and enable optical spectra to be recorded and analyzed. Spectrometers are widely used among others in chemical and medical analytics in order to determine components of a liquid on the basis of their spectral properties. Spectrometers that are used for this purpose frequently operate according to the polychromator principle, i.e., in these methods the irradiated light is not split into its spectral components by a polychromator until after it has passed through the sample liquid and the spectral components can thus be imaged simultaneously on a detector array. This enables an entire spectrum to be recorded simultaneously (Optical Multichannel Analyzer (OMA) or Multi Channel Spectrometer (MCS)). This is an advantage over conventional monochromator systems in which the wavelengths have to be scanned successively. Modern multi channel spectrometers can transfer a complete spectrum very rapidly to the evaluation electronics. Typical measuring times are a few milliseconds and typical resolutions of the detector arrays that are used are 128, 256, 512, 1024 or 2048 pixels/spectrum. Other advantages of polychromator spectrometers are the small number of optical components and the omission of mechanically moved parts which makes them considerably cheaper to manufacture.

A typical field of use for spectrometers is for example the analytical determination of hemoglobin derivatives in blood, the so-called CO-oximetry. An example of such a spectrometry module is the COOX module of the cobas b 221 (Roche Diagnostics GmbH, Germany) for determining bilirubin (bili), total hemoglobin (tHb) and the hemoglobin derivatives oxyhemoglobin (O2Hb), deoxyhemoglobin (HHb), carboxyhemoglobin (COHb) and methemoglobin (MetHb). In this case the hemoglobin derivatives and bilirubin are determined on the basis of the Lambert-Beer law. The optical system of this CO oximetry module consists of a halogen lamp, slit, cuvette holder with a cuvette as well as a polychromator and detection unit. The light of a halogen lamp is guided to the cuvette holder with the aid of a light guide. In the cuvette the light is partially absorbed by the sample and partially transmitted. The absorption is characteristic for the composition of the sample. The transmitted light is guided to the polychromator by a further light guide where it is split into its spectral components and imaged on the surface of a photosensitive receiver (CCD sensor). The absorption and ultimately the concentration of the hemoglobin derivatives are calculated from the resulting electrical signal. In order to achieve a high reliability in operation, the polychromator is calibrated with a built-in spectral light source. This calibration is carried out after each switching on of the instrument and at least once daily during the system calibration.

Many analytical applications for spectrometers require instrument-specific calibration data, the generation of which is often time-consuming and costly. For example, apparently identical instruments which are produced by the same manufacturer can exhibit minor instrument variations; such variations are seen when an instrument is built with a component which slightly deviates from the same component in another instrument. Furthermore, a calibrator set for an instrument produced by one manufacturer is in general unsuitable for a similar instrument which is produced by another manufacturer: Furthermore, repairs on a single instrument can have the effect that the spectral response of the instrument varies. If an instrument ages it can change its spectral response. The spectral response of an instrument can additionally vary due to fluctuations in the operating environment. In the case of medical-diagnostic applications which often require an exact analysis of analytes also at very low concentrations, even a small instrument variation can result in an unacceptable error in the analysis.

In the development of analytical instruments for biomedical applications based on spectroscopy there is a need to produce hundreds to many thousands of identically constructed analytical instruments for a certain application. There is no effective method for rapidly and cost-effectively calibrating individual instruments for such large numbers of instruments. Therefore, in this case one endeavors to transfer calibrations from one analytical instrument to the next. This is achieved practically by generating a calibration data set in the factory on a primary spectrometer which serves as a standard. This data set is subsequently transferred to one or many secondary spectrometers that are identical in construction which can then be delivered to the customers together with these calibration data of the primary spectrometer. As mentioned above, even slight individual differences between the primary spectrometer and secondary spectrometer can mean that the calibration data of the primary spectrometer cannot be used without changes on the secondary spectrometer because otherwise this may result in unacceptable inaccuracies in the analyte determination due to the non-instrument-specific calibration data especially in the case of applications for medical diagnostics. A critical calibration parameter of spectroscopic analytical systems is the wavelength calibration, i.e., the assignment of the individual pixels of a recorded spectrum to certain wavelength ranges which are imaged on them.

Such a wavelength calibration can for example be determined by a wavelength assignment in the form of a suitable assignment function which, for example, in the form of a polynomial of the $3^{rd}$ degree assigns a wavelength $\lambda$, for example in nm, to a certain pixel number x by means of the polynomial function $\lambda(x) = a_0 + a_1 x + a_2 x^2 + a_3 x^3$.

Various methods are already known in the prior art for calibrating the wavelengths of spectrometers.

In the conventional wavelength calibration methods, a spectrum for example of a neon lamp imaged on the detection unit is used in a peak search method to determine at which pixel the respective emission peaks of the neon lamp, whose exact wavelength is known, are situated. In this case each peak usually extends over several pixels, the maximum can also fall between two pixels. This peak can be represented by a suitable mathematical function using the intensity values of the pixels. One method of determining the position of the peaks as exactly as possible, is an integration of the mathematical function that is used and subsequent subdivision of the area under the curve determined in this manner into two partial areas of equal size where the peak center is defined as that pixel number at which this subdividing line is positioned. In this case it is also possible that the peak center is between two real pixels and thus a non-integral, virtual pixel number can be obtained as a peak center. Those pairs of values consisting of a known wavelength and pixel number of the respective peak must be determined in this manner for each of several peaks which form the design points for a fitting for example to a polynomial of the $3^{rd}$ degree according to the least squared error method. Typically at least 4 to 8 peaks are required in the peak search method for a sufficiently accurate wavelength calibration. The other measurement ranges of the spectrum in which no sufficiently narrow peaks are to be found, cannot be additionally used in this method. The coefficients determined by the fitting, for example $a_0$, $a_1$, $a_2$, $a_3$ in the case of a fitting to a polynomial of the $3^{rd}$ degree, at the same time represent the coefficients of a wavelength assignment for example according to $\lambda(x)=a_0+a_1 x+a_2 x^2+a_3 x^3$.

There are numerous other peak search methods which are used in the prior art. Thus, for example a bandwidth method can be used in which firstly the pixel with the maximum intensity value is determined for one peak. Subsequently the pixel numbers are determined at which a certain percentage, for example 70%, 50% or 30%, of the maximum intensity value is reached. Also in this case interpolation methods can again be used to increase the accuracy and hence non-integral pixel numbers can be obtained as virtual pixel numbers. Two pixel numbers, one to the left and one to the right of the intensity maximum, are obtained from which the sought-after peak center can be obtained by averaging.

Another possible method is the parabola method. The basis of this method is the fact that a parabola can be unequivocally defined by three points. Firstly the pixel of the peak is determined which has the maximum intensity value of the observed peak. In addition the intensity values of the pixels which are to the left and right of this pixel are determined. A parabolic equation can be determined from these three value pairs the apex of which corresponds to the peak center. Also in this case interpolation methods could be used to increase the accuracy so that non-integral pixel numbers can be obtained as virtual pixel numbers.

U.S. Pat. No. 6,700,661 describes a wavelength calibration method in which a defined reference sample is measured on a secondary spectrometer and its (corrected) spectral curve S*sec is compared with a reference spectrum Xsec which is also stored on the instrument. A so-called "spectral residual" value is introduced as a value for the agreement between the two spectra. For the wavelength calibration a wavelength-pixel number relation is used at which a minimum value of the "spectral residual" value is reached. Iterative methods are used to determine this minimum value in order to determine the wavelength-pixel number relation at which the best agreement between the measured spectrum of the reference sample and its deposited reference spectrum occurs.

In order to carry out a wavelength calibration according to this method, it is absolutely essential to measure a reference sample having an exactly defined composition. Additional calibration solutions are required for this, the lot-specific composition of which introduces further variables into the calibration which in turn can impair the accuracy of the calibration. In the case of the iterative method used here, it is additionally very difficult to determine a wavelength assignment with a polynomial of more than the $1^{st}$ degree which limits the accuracy of the calibration. Furthermore, this method requires the additional step of calculating a correction spectrum which increases the demands on the computing power of a data processing system instructed to carry out the calculation.

Spectrometers are described in U.S. Pat. No. 4,866,644 which use moved optical elements such as swivelling defraction gratings or interference filter arrangements in order to split up the excitation light into its spectral components which are successively irradiated into the sample. Errors in the wavelength assignment can occur in such spectrometer types especially as a result of the mechanical grating drives and controls.

In order to take into account such errors, a wavelength calibration and a spectral correction of the secondary spectrometer with reference to a primary spectrometer are carried out in the factory. For this purpose a large number of different samples are measured on the primary as well as on the secondary spectrometer and specific model spectra are set up on the basis of these data for each sample type. The measured values of the various model spectra are then consolidated into a respective set per wavelength or corresponding unit. A correlation analysis is carried out with about 5 neighboring sets of the secondary spectrum for each set of the primary spectrum. The best correlation value is in this case determined as a maximum value or by fitting the individual values with a quadradic function. This is carried out successively for all sets of the primary spectrum. A new wavelength assignment is determined. by correlation calculations using the function of the $1^{st}$ degree between the individual value pairs. In this case natural samples such as soy beans or grain are used as samples to carry out a wavelength calibration at the factory. It is therefore difficult for a user to carry out a wavelength calibration at a later time because such natural samples cannot be stored for longer periods without changing their optical properties. The use of such natural reference materials is also critical because it is not possible to ensure a standardization of their spectral properties.

U.S. Pat. No. 5,347,475 describes a wavelength calibration method which is essentially based on monochromatic light which has exactly defined atomic emission lines.

These are used for the purposes of wavelength calibration by determining their known position by a primary and secondary spectrometer. In this case peak search methods are used to find the position of the atomic emission lines which make high demands on the resolution and accuracy of the spectrometers that are used. The methods that are described here are primarily suitable for use in high resolution spectrometers with a resolution of less than 2 nm.

U.S. Pat. No. 5,771,094 describes a method for the continuous monitoring of the wavelength calibration of a secondary spectrometer by determining the position of one or more previously selected peaks or atomic lines from the spectrum of the irradiated light. Conventional peak search methods are used for this purpose. In this manner deviations can be determined from a comparison of the actual values with the peak maxima deposited in the secondary spectrometer and correction measures can be initiated. Also in this case the described methods make high demands on the accuracy and resolution of the spectrometer which must resolve atomic lines.

The wavelength calibration methods described above have the major disadvantage that for system-related reasons they can hitherto only be used for high resolution spectrometers (i.e., spectrometers with the narrowest possible bandwidth) because peaks resolved to a sufficient extent can only be obtained in such a spectrum). FIG. 1 shows in this connection two spectra of the same neon lamp in the wavelength range of 660 nm to 960 nm. The wavelength $\lambda$ (in nm) is plotted on the x axis and the intensity I (in relative units) normalized to the maximum value is plotted on the y axis. The spectrum shown by a continuous line was recorded with a spectrometer having a bandwidth of 2.5 nm, the spectrum shown with a dashed line was recorded with a spectrometer with a bandwidth of 8 nm.

It can be dearly seen that the narrow peaks of the neon spectrum required for wavelength calibration by means of the peak search method can only be adequately resolved with a high resolution spectrometer in order to ensure an adequate quality of a wavelength calibration. The peaks required for this can no longer be adequately resolved by spectrometers with a lower resolution (see, for example, non-resolved multiple peaks at 660-680 nm or 730-760 nm or shoulders instead of resolved single peaks in the range of 680-700 nm and 870-890 nm) which would greatly reduce the accuracy of a wavelength calibration based on this by means of a peak search method. With the previously described peak search methods, especially those using the surface integration method, a calibration accuracy of $\pm 5 \cdot 10^{-3}$ nm, which is necessary especially for applications in the medical diagnostic field, can only be achieved by using high quality spectrometers of low bandwidth. In this case the calibration accuracy is understood as the maximum error (calculated wavelength minus the reference wavelength) over the entire wavelength range. As a result only high resolution spectrometers have been used for such medical diagnostic analytical systems which, due to their high demands on the quality of manufacture and resolution, are complex and costly. Because, as already mentioned, such analytical systems are often manufactured in large numbers, this restriction to such spectrometers represents a considerable production cost factor.

Hence, for such applications it is desirable to use spectrometers with a smaller overall size and lower price. However, such spectrometers often have poorer optical properties such as a larger bandwidth and asymmetric peak representation. When these spectrometers are calibrated by the user with the aid of a conventional peak search method, calibration accuracies of only up to 1 nm are possible which is not sufficient for applications in medical diagnostics. Although calibration accuracies of less than 1 nm can be achieved in the factory, this requires the use of very expensive spectral lamps and is very laborious so that it cannot be employed as a standard by users. Consequently, the previously used peak search methods do not yield satisfactory results for such low-cost spectrometers.

Furthermore, conventional wavelength calibration methods based on the peak search principle often require spectral lamps or similar light sources which have a large number of peaks that are as narrow as possible. The use of alternative and possibly more cost-effective light sources for wavelength calibration has previously not been possible due to their emission spectra which usually have too few and/or too broad emission peaks. Due to the optical bandwidth of the spectrometers, on the one hand, and the limited number of peaks of spectral lamps on the other hand, only a few suitable peaks are available which limits the quality of the wavelength calibration because all other ranges of the spectrum cannot be used to determine calibration values.

SUMMARY OF THE INVENTION

It is against the above background that the present invention provides certain unobvious advantages and advancements over the prior art. In particular, the inventors have recognized a need for improvements in methods for the wavelength calibration of spectrometers.

Although the present invention is not limited to specific advantages or functionality, it is noted that the present invention provides alternative methods for wavelength calibration. In particular, the present invention provides methods for wavelength calibration which, even when using low-cost spectrometers with a broader bandwidth, ensure a high calibration accuracy and thus in particular also enable the use of such spectrometers in analyzers for medical diagnostics.

The present invention also provides methods for wavelength calibration in which it is possible to use alternative and possibly more cost-effective light sources.

The present invention also provides methods for wavelength calibration in which complicated calculation steps can be avoided as far as possible and which can thus be carried out with simpler data processing systems.

The present invention also provides methods for wavelength calibration in which it is possible to dispense with the use of external reference media for carrying out the wavelength calibration.

The present invention further provides methods for wavelength calibration which can be carried out as part of the usual calibration procedures for spectrometers without additional effort.

In accordance with the present invention, a method for the wavelength calibration of a spectrometer on which at least the data of two measured-value blocks of a model spectrum are present, is provided, which method comprises the steps:
  a. determining the intensity spectrum of a light source on the spectrometer as a calibration spectrum,
  b. cutting out a measured-value block from the calibration spectrum which corresponds to one of the measured-value blocks present on the spectrometer,
  c. shifting the measured-value block of the calibration spectrum in a stepwise manner relative to the measured-value block of the model spectrum and determining in each case a correlation value between the two measured-value blocks,
  d. determining a shift value at which the correlation value reaches an optimum,
  e. determining a value pair consisting of a position marker of the measured-value block of the model spectrum and the shift value,
  f. repeating process steps b. to e. for all further measured-value blocks of the model spectrum,
  g. fitting the value pairs obtained in process steps b. to f. consisting of the position marker of the respective measured-value block of the model spectrum and the associated shift value, to an assignment function to obtain the coefficients $a_0, a_1 \ldots$,
  h. using these coefficients to determine a wavelength assignment of the spectrometer.

In accordance with a first typical embodiment of the invention, a method for the wavelength calibration of a secondary spectrometer which has a detection unit as well as a memory in which at least the data of two measured-value blocks of a model spectrum that was determined on a primary spectrometer as the intensity spectrum of a light source, are present, is provided, which method comprises at least the following steps:
  a. determining the intensity spectrum of a light source on the secondary spectrometer as a calibration spectrum, where the light source and detection unit used for this have a comparable type of construction to the light source and detection unit used to determine the model spectrum and the calibration spectrum is determined under comparable conditions to those used to determine the model spectrum,
  b. cutting out a measured-value block from the calibration spectrum which corresponds to one of the measured-value blocks of the model spectrum which is present in the memory of the secondary spectrometer,
  c. shifting the measured-value block of the calibration spectrum in a stepwise manner relative to the measured-value block of the model spectrum by in each case a single or multiple pixel value and in each case determining a correlation value between the two measured-value blocks which is a measure for the agreement between the intensity values of the two measured-value blocks,
d. determining a shift value as a sum of the position marker of the measured-value block and the distance between the position marker of the measured-value block of the model spectrum and the corresponding position marker of the calibration spectrum at which the correlation value reaches an optimum,
e. determining a value pair consisting of the position marker of the measured-value block of the model spectrum and the shift value after process step d,
f. repeating process steps b. to e. for all further measured-value blocks of the model spectrum,
g. determining a wavelength assignment as an assignment function, the coefficients of which $a_0, a_1 \ldots$ were obtained by fitting the value pairs obtained in process steps b. to f. consisting of the position marker of the measured-value block of the model spectrum and the associated shift value.

In accordance with a second typical embodiment of the invention, a method for the wavelength calibration of a secondary spectrometer which has a detection unit as well as a memory in which at least the data of two measured-value blocks of a model spectrum that were determined on a primary spectrometer as an intensity spectrum of a light source, as well as a first wavelength assignment in the form of an assignment function with the coefficients $a_0, a_1 \ldots$ are present is provided, which method comprises at least the following steps:
  a. determining the intensity spectrum of a light source on the secondary spectrometer as a calibration spectrum, where the light source and detection unit used for this have a comparable type of construction to the light source and detection unit used to determine the model spectrum and the calibration spectrum is determined under comparable conditions to those used to determine the model spectrum,
  b. cutting out a measured-value block from the calibration spectrum which corresponds to one of the measured-value blocks of the model spectrum which is present in the memory of the secondary spectrometer,
  c. shifting the measured-value block of the calibration spectrum in a stepwise manner relative to the measured-value block of the model spectrum by in each case a single or multiple pixel value and in each case determining a correlation value between the two measured-value blocks which is a measure for the agreement between the intensity values of the two measured-value blocks,
  d. determining a shift value as a sum of the position marker of the measured-value block of the model spectrum and the distance between the position marker of the measured-value block of the model spectrum and the corresponding position marker of the calibration spectrum at which the correlation value reaches an optimum,
  e. determining a value pair consisting of the position marker of the measured-value block of the model spectrum and the shift value after process step d,
  f. repeating process steps b. to e. for all further measured-value blocks of the model spectrum,
  g. determining correction coefficients $a_0', a_1' \ldots$ by fitting the value pairs obtained in process steps b. to f. consisting of the position marker of the measured-value block of the model spectrum and the associated shift value, to an assignment function,
  h. determining a wavelength-calibrated wavelength assignment by replacing the coefficients $a_0, a_1 \ldots$ of the first wavelength assignment by the corresponding correction coefficients $a_0', a_1' \ldots$ determined in process step g.

In accordance with a third typical embodiment of the present invention, a method for the wavelength calibration of a secondary spectrometer which has a detection unit as well as a memory in which at least the data of two measured-value blocks of a model spectrum that was determined on a primary spectrometer as an intensity spectrum of a light source, as well as a first wavelength assignment in the form of an assignment function with the coefficients $a_0, a_1 \ldots$ are present is provided, which method comprises at least the following steps:
  a. determining the intensity spectrum of a light source on the secondary spectrometer as a calibration spectrum, where the light source and detection unit used for this have a comparable type of construction to the light source and detection unit used to determine the model spectrum and the calibration spectrum is determined under comparable conditions to those used to determine the model spectrum,
  b. cutting out a measured-value block from the calibration spectrum which corresponds to one of the measured-value blocks of the model spectrum which is present in the memory of the secondary spectrometer,
  c. shifting the measured-value block of the calibration spectrum in a stepwise manner relative to the measured-value block of the model spectrum by in each case a single or multiple pixel value and in each case determining a correlation value between the two measured-value blocks which is a measure for the agreement between the intensity values of the two measured-value blocks,
  d. determining a shift value as the distance between the position marker of the measured-value block of the model spectrum and the corresponding position marker of the calibration spectrum at which the correlation value reaches an optimum,
  e. determining a value pair consisting of the position marker of the measured-value block of the model spectrum and the shift value after process step d,
  f. repeating process steps b. to e. for all further measured-value blocks of the model spectrum,
  g. determining correction coefficients $\Delta a_0, \Delta a_1 \ldots$ by fitting the value pairs obtained in process steps b. to f. consisting of a position marker of the measured-value block of the model spectrum and the associated shift value, to an assignment function,
  h. determining a wavelength-calibrated wavelength assignment by combining the correction coefficients $\Delta a_0, \Delta a_1 \ldots$ determined in process step g. with the corresponding coefficients $a_0, a_1 \ldots$ of the first wavelength assignment and in particular by adding them thereto.

These and other features and advantages of the present invention will be more fully understood from the following detailed description of the invention taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which:

FIG. 2 shows a cross-correlation function used in accordance with an embodiment of the present invention to describe the correlation between two signals at different time shifts r between the two signals;

FIGS. 4-6 show equations employed in one or more embodiments of the present invention.

DETAILED DESCRIPTION OF THE INVENTION

Figure 1:
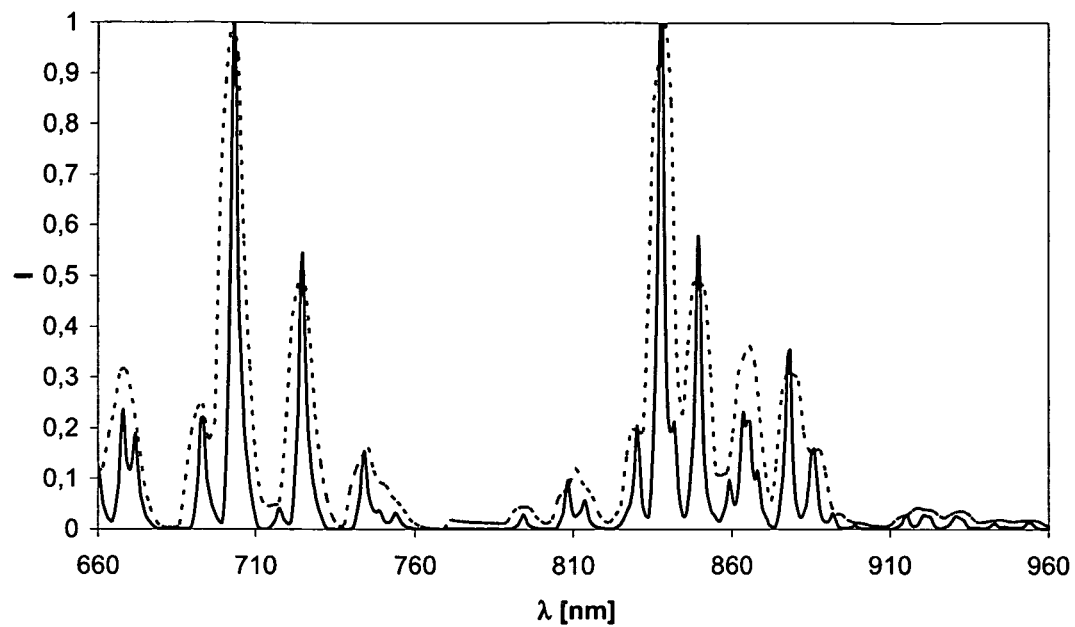
FIG. 1 shows two spectra of the same neon lamp in the wavelength range of 660 nm to 960 nm.

The various embodiments of the present invention are based on the application of the common inventive principle of a stepwise relative shift of measured-value blocks (corresponding to process step c.) of a calibration spectrum determined on the secondary spectrometer (corresponding to process step a.) with the corresponding measured-value blocks of a model spectrum present in the memory of the secondary spectrometer (corresponding to process step b.) wherein a correlation value for the agreement between the measured-value blocks is determined for each shift step (corresponding to process step c.). According to the present invention, for each measured-value block of the model spectrum, a shift value is determined at which the correlation value reaches an optimum, i.e., at which the corresponding measured-value blocks of the model spectrum and of the calibration spectrum agree best (corresponding to process step d.). This shift value shows at which relative shift of the corresponding measured-value blocks of the model spectrum and calibration spectrum the best agreement is achieved. In the case of an optimal correlation when the measured-value block of the calibration spectrum is shifted by two pixels to the right relative to the corresponding measured-value block of the model spectrum which has the position marker pixel 32, this can for example be stated in the form of a difference value +2 (corresponding to the third typical embodiment) or of the absolute value 34 (=position marker pixel 32+relative shift of +2 pixels) (corresponding to the first and second typical embodiment). For each measured-value block of the model spectrum a value pair consisting of the respective position marker of the measured-value block of the model spectrum and the associated shift value is determined (corresponding to process step e.). These value pairs represent the design points for fitting to a suitable assignment function (corresponding to process step g.). The coefficients $a_0, a_1 \ldots$ obtained in this manner can now be used directly as coefficients of a wavelength assignment (corresponding to process step g. of the first typical embodiment) or be combined with the coefficients of an existing first wavelength assignment, either by for example replacing them (corresponding to process step h. of the second typical embodiment) or combining them with the coefficients of an existing first wavelength assignment (corresponding to process step h. of the third typical embodiment).

In the case of the first typical embodiment of the method according to the invention no first wavelength assignment is present on the secondary spectrometer but rather only at least two measured-value blocks of a model spectrum which consist of a position marker of the measured-value block and at least two value pairs each consisting of a pixel number and intensity value of the model spectrum at this pixel number. The method according to the invention can be used to determine value pairs for each of these measured-value blocks consisting of the respective position marker of the measured-value block of the model spectrum and the associated shift value. When combined with the known position marker of the measured-value blocks of the model spectrum, this allows the wavelengths of the secondary spectrometer to be calibrated by assigning the position markers of the model spectrum a corresponding position of the corresponding position marker of the calibration spectrum by means of the assignment function obtained. Such methods can be used especially when a wavelength assignment of the pixels to the corresponding wavelengths is not absolutely necessary. Thus, for example in some applications it may be sufficient to be able to compare certain regions with one another without knowing the exact wavelength assignment. In these cases it is sufficient when it can be ensured that corresponding spectral regions are taken into consideration. This can be achieved by an inventive method according to the first typical embodiment of the present invention.

In many cases wavelength assignments are already available for the secondary spectrometer. Such wavelength assignments are often provided by the spectrometer manufacturers and correspond to the first wavelength assignments in the sense of the present application. Such wavelength assignments are generally described by a suitable assignment function and at least by a polynomial of at least the $1^{st}$ degree in the form of an equation $\lambda(nm)=a_0+a_1 x+ \ldots$ in which the coefficients $a_0, a_1 \ldots$ determine the respective wavelength assignment of the pixel x and thus represent the parameters which have to be determined as part of a wavelength calibration. In the case of spectrometers with an identical construction, these can for example be determined in the factory on a primary spectrometer which serves as a standard or reference spectrometer, for example by means of conventional peak search methods, and then be transferred to the secondary spectrometers and stored there as their first wavelength assignment under the assumption that spectrometers with an identical construction have similar optical properties. However, due to individual differences between the optical systems of the respective secondary spectrometers and that of the primary spectrometer, deviations in the imaging properties may occur such that the first wavelength assignments on the secondary spectrometer no longer lead to comparable results. Hence, there is often a need to take into account these individual differences between the spectrometers by calibrating the wavelength of the secondary spectrometer. The methods according to the invention can be used for this.

Another method of making a first wavelength assignment on the secondary spectrometer is to calibrate the spectrometer in the factory by means of a calibration with defined light sources and/or defined calibration solutions. However, such calibration steps in the factory are complicated because they have to be carried out individually for each secondary spectrometer that is manufactured. In this case the wavelength assignments obtained by the individual calibration in the factory correspond to the first wavelength assignments in the sense of the present application. Such first wavelength assignments on the secondary spectrometer can be determined by means of known calibration methods and in particular by peak search methods. Spectrometers also have the property that their optical properties can change over time depending on the external environment and conditions (temperature, mechanical vibrations . . . ). Hence, it is often necessary to take into account the resulting individual differences of the spectrometers by a regular wavelength calibration of the secondary spectrometer. The methods according to the invention can be used for this purpose.

In the case of the second typical embodiment of the method according to the invention, correction coefficients $a_0'$, $a_1'$ ... are obtained in process step g. based on the value pairs consisting of the position marker of the measured-value block of the model spectrum and the shift value, by fitting to an assignment function. Since the shift value in this case is determined in process step d. as a sum of the position marker of the measured-value block of the mode; spectrum and the distance between the position marker of the measured-value block of the model spectrum and the corresponding position marker of the calibration spectrum at which the correlation value reaches, an optimum, it corresponds to an absolute value which already takes into account the original wavelength assignment as well as a potential individual wavelength shift. In this case in process step h. the coefficients $a_0$, $a_1$ ... of the first wavelength assignment can be replaced with the correction coefficients $a_0'$, $a_1'$ ... determined in process step g. to thus obtain a wavelength-calibrated wavelength assignment which in the case of a polynomial is obtained as an assignment function for example in the form of an equation $\lambda_{cal}$ (nm)=$a_0'$, $a_1'$ x+ ...

In the case of the third typical embodiment of the method according to the invention, correction coefficients $\Delta a_0$, $\Delta a_1$ ... are obtained in process step g. on the basis of the value pairs consisting of the position marker of the measured-value block of the model spectrum and the shift value, by fitting to an assignment function. Since the shift value in this case is determined in process step d. as the distance between the position marker of the measured-value block of the model spectrum and the corresponding position marker of the calibration spectrum at which the correlation value reaches an optimum, it corresponds to a difference value which only takes into consideration a potential individual wavelength shift. In this case in process step h. the correction coefficients $\Delta a_0$, $\Delta a_1$ determined in process step h. must be additionally combined with the coefficients $a_0$, $a_1$ ... of the first wavelength assignment and in particular added thereto in order to also take into consideration the original wavelength assignment. Thus, as a result a wavelength-calibrated wavelength assignment is obtained which in the case of a polynomial is obtained as an assignment function for example in the form of an equation $\lambda_{cal}(nm)=(a_0+\Delta a_0)+(a_1+\Delta a_1)x+ ...$ In particularly typical cases the correction coefficients are determined in process step g. by fitting the value pairs consisting of the position marker of the measured-value block of the model spectrum and the assigned shift value, to an assignment function which corresponds to the assignment function of the first wavelength assignment. However, in principle this assignment function used in process step g. does not have to be identical to the assignment function of the first wavelength assignment. It is also possible to combine two different assignment functions and in particular to add them. This is possible especially in the case of polynomials as assignment functions. Thus, if in process step g. a polynomial of a higher order than that of the polynomial of the first wavelength assignment is used, the coefficients of the polynomial of the first wavelength assignment are replaced by the corresponding coefficients of the polynomial used in process step g. or are combined with these coefficients and in particular added to these coefficients and the coefficients of the polynomial used in process step g. which do not find any equivalent in the polynomial of the first wavelength assignment can be added as additional coefficients of the wavelength-calibrated wavelength assignment. If in process step g. a polynomial of a lower order than that of the polynomial of the first wavelength assignment is used, the coefficients of the polynomial used in process step g. can replace or be combined with and in particular added to the corresponding coefficients of the polynomial of the first wavelength assignment, and the additional coefficients of the polynomial of the first wavelength assignment which find no equivalents in the polynomial used in process step g. can be set to zero in the wavelength-calibrated wavelength assignment.

The methods according to the invention for the wavelength calibration of a secondary spectrometer provide for the first time methods for the wavelength calibration of spectrometers which have a relatively low optical quality, i.e., a large bandwidth. These spectrometers which are often considerably cheaper and more compact can also be calibrated very accurately with the methods according to the invention and thus for the first time become available also for use in analyzers for medical diagnostics.

Furthermore, the wavelength calibration methods according to the invention which are no longer limited to the use of calibration spectra with a large number of very narrow peaks as a calibration basis also allow the alternative use of low-cost light sources which do not necessarily have to yield spectra with such large numbers of peaks. This for example enables the use of broad band light sources such as halogen lamps, the emission spectra of which can be further optimized for the use according to the invention by using filters such as rare-earth metal filters.

Since, in contrast to many methods of the prior art, the methods according to the invention are not based on iterative methods and thus methods requiring a high computing capacity, repeated complicated calculation steps can be omitted as far as possible so that the methods according to the invention can be carried out with relatively simple data processing systems.

Since in the methods according to the invention the intensity spectrum of a light source in the spectrometer is used for wavelength calibration purposes, it is not necessary to use additional external reference media to carry out the wavelength calibration. The wavelength calibration methods according to the invention can be automated in a short time and can be carried out at regular intervals which has considerable advantages with regard to reliability and user friendliness. Thus, the methods according to the invention for wavelength calibration can for example be carried out automatically without additional effort as part of the usual calibration procedures for spectrometers without the user having to intervene.

Definitions

Wavelength calibration in the sense of the present application is generally understood as a method of assigning the wavelength range imaged thereon to a certain region of a spectrum recorded by the detection unit. The respective range of the recorded spectrum is generally described by specifying the corresponding pixels (number and position).

Wavelength assignment in the sense of the present invention is understood as an assignment function which assigns a defined wavelength imaged thereon (or a defined small wavelength range) to a certain pixel x of a spectrum recorded by the detection unit. Such wavelength assignments are usually carried out in the form of polynomial functions of at least the $1^{st}$ degree. Such wavelength assignments are often described by polynomial functions of the $3^{rd}$ degree which assign a wavelength $\lambda$ to a particular pixel number x by means of the polynomial function $\lambda(x)=a_0+a_1 x+a_2 x^2+a_3 x^3$. In this case the coefficients $a_0$, $a_1$, $a_2$ and $a_3$ represent the individual calibration parameters, the values of which can be determined as part of a wavelength calibration. Assignment functions can, in addition to the typical polynomial functions, in principle be any other types of function which establish an unequivocal relation between a certain pixel and a wavelength or wavelength range imaged thereon. Such types of function can for example be linear functions, quadratic functions, cubic functions, power functions, root functions, rational or broken-rational functions, trigonometric functions, arcus functions, exponential functions, logarithmic functions, hyperbolic functions and other types of functions known to a person skilled in the art from which he can select a suitable function depending on the value pairs that are present.

A primary spectrometer (also primary or master instrument) within the sense of the present invention is understood as a reference spectrometer which is used as a standard and on which a model spectrum is generated as a reference. In addition, wavelength assignments can also be generated on a primary spectrometer which can be transferred to secondary spectrometers with an identical construction and on these secondary spectrometers correspond to first wavelength assignments in the sense of the present application. Primary spectrometers usually stand-in the factory and serve as reference instruments for calibrating many secondary spectrometers of the same type. A wavelength assignment of the primary spectrometer can also be carried out according to a method of the prior art (e.g., by means of peak search methods).

A secondary spectrometer (also secondary, target, field or slave instrument) within the sense of the present application is understood as a spectrometer which is used by the end-user and has the same type of construction as the primary spectrometer. Secondary spectrometers are often manufactured in large numbers so that an individual calibration of each individual secondary spectrometer is very time-consuming and costly. A first wavelength assignment is often already present on the secondary spectrometer which can be carried out by means of an individual first calibration in the factory or if the primary and secondary spectrometer are of the same make, by transferring the wavelength assignment of the primary spectrometer to the secondary spectrometer. If the secondary and primary spectrometers are very different, a first wavelength assignment of the secondary spectrometer can also be determined by means of known calibration methods and in particular by peak search methods. In this case in particular a first wavelength calibration can be carried out by a peak search method in order to approximately determine the position of the measured-value blocks before a more exact wavelength calibration is carried out on this basis using the method according to the invention.

In principle the primary spectrometer and secondary spectrometer can also be the same instrument. In this case a spectrometer is for example calibrated once in the factory using a conventional wavelength calibration method and its own model spectrum is recorded (corresponds to the primary spectrometer). Subsequently after delivery to the customer, the spectrometer is calibrated by the user with the aid of the methods according to the present invention (corresponds to the secondary spectrometer). Such embodiments are also encompassed by the present invention.

Model spectrum in the sense of the present invention is understood as an intensity spectrum of a light source which has been determined as a reference spectrum using the primary spectrometer. A spectrum is generally understood as the intensity of an electromagnetic radiation as a function of the wavelength, the frequency or the energy where wavelength, energy and frequency are equivalent quantities. Especially in the case of spectrometric methods which use detector arrays, it is possible to plot the intensity as a function of the pixel number of the detector array on which the spectrum is imaged because, after an appropriate wavelength calibration, there is an unequivocal relationship between the pixel number and the spectral range imaged thereon. In this connection the intensity spectrum of a light source is not only understood as the direct emission spectrum of a light source. Emission spectra of light sources whose spectral properties have been modified between the site of emission in the light source and the detection unit can also be regarded as intensity spectra of light sources in the sense of the present application. Thus, for example, optical filter elements can be introduced in order to allow certain spectral ranges to pass through selectively or to exclude these ranges. Furthermore, certain dyes or optically absorbing and/or scattering media can for example be introduced into the optical path which result in additional modifications of the spectrum which can be for example specifically used in the form of additional maxima or minima for calibration or control purposes. Such media can for example be special calibration or quality control liquids. In addition, special dyes can be introduced into the optical path which can for example enlarge the spectral range of the light arriving at the detection unit by means of fluorescence and/or luminescence. Due to the detector the primary recorded model spectrum only has a limited number of measured values (=real pixels) and can therefore be interpolated by a suitable method to obtain intermediate values in order to obtain additional virtual measured values. Such methods can considerably increase the accuracy of a wavelength calibration.

A calibration spectrum in the sense of the present application is understood as an intensity spectrum of a light source which has been determined using a secondary spectrometer and serves as a starting point for a wavelength calibration of the secondary spectrometer. When determining a calibration spectrum on a secondary spectrometer, the light source and detection unit of the secondary spectrometer which are used for this purpose should have a comparable type of construction to the light source and detection unit used to determine the model spectrum and the calibration spectrum should be determined under comparable optical conditions to those used to determine the model spectrum.

A measured-value block in the sense of the present application is understood as a section of a plurality of adjacent intensity values (e.g. 32) from the model spectrum or the calibration spectrum. A measured-value block contains a position marker of the measured-value block and at least two value pairs each consisting of a pixel number and intensity value of the model spectrum or of the calibration spectrum at this pixel number. Hence, a measured-value block corresponds to a certain partial spectrum of the model or calibration spectrum which is unequivocally identified by the position marker and the width of the spectral range (number of value pairs).

A detector array in the sense of the present application generally refers to an arrangement of adjacent light-sensitive detectors. Such diode array detectors or photodiode arrays usually consist of a group of linearly arranged (linear) photodiodes and usually one integrated supply and reading circuit. The number of individual diodes on the chip is limited. Modern components typically have 128, 256, 512 or also 1024 individual elements. In this case such an individual element corresponds to a pixel. Arrangements of several linear detector lines on top of one another are also known (two-dimensional arrays) which, when they are appropriately actuated, can also be used as linear detector arrays in the sense of the present application. Such one-dimensional or two-dimensional detector arrays can for example be CCD chips, CMOS chips, photodiode arrays, avalanche diode arrays, multichannel plates and multichannel photomultipliers.

A pixel in the sense of the present invention is generally understood as the smallest unit into which the x axis of a spectrum is subdivided. When a detector array and in particular a linear detector array is used as a detection unit, the pixels initially basically correspond to the individual adjacent light-sensitive components (photodiodes). In spectrometers of the monochromator type no detector arrays are used as detection units but rather a suitably sensitive single detector (e.g., a photodiode, a semi-conductor detector or a photomultiplier). In the case of spectrometers of the monochromator type an imaging system forms an image of the light source on a slit and a monochromator is used to select the wavelength which passes through the slit. The monochromator is for example driven by a stepper motor and radiates in each case the wavelength relating to the position of the monochromator into the slit. An additional imaging system is used to focus the radiation from the monochromator slit onto the sample and, after interaction with the sample, to image it on the detection unit. The order can also basically be reversed, i.e., the path of the light of the light source firstly passes through the sample and only then through the monochromator and further onto the detection unit. Typically an analytical system subsequently brings together the respective value of the respective irradiated wavelength and the associated detector signal and displays it in the form of a spectrum. The methods according to the invention are also basically suitable for use with spectra that have been obtained by means of such a monochromator spectrometer. In this case the wavelengths or wavelength ranges that are simultaneously imaged on the detection unit are regarded as pixels. These parameters depend, on the one hand, on the width of the monochromator slit and, on the other hand, on the way in which the optical element (e.g., prisma or diffraction grating) used for this spectral resolution is actuated. If for example a stepper motor is used to actuate the optical element used for the spectral resolution, the respective spectral range at the monochromator slit can for example be determined by the respective position of the stepper motor. If the optical element used for the spectral resolution is for example actuated in a continuous movement, the spectral ranges at the monochromator slit can for example be defined by their correlation with certain time intervals after starting the movement of the optical element used for the spectral resolution.

In addition to the x real pixel values which for example correspond to the x individual elements of the detector array (e.g., 128, 256, 512 or 1024), additional intermediate values can be obtained by interpolation methods which are present as virtual pixels at defined distances between the real pixels. Thus, for example by interpolation of in each case 9 or 99 virtual intermediate values between two real pixels, the pixel number of a spectrum which was obtained with a detector array consisting of 512 individual diodes can be increased to a calculated pixel number of 5111 or 51101 pixels. Such interpolation methods for increasing the pixel number enhance the accuracy of the method according to the invention for wavelength calibration. The real measured pixels as well as the virtual pixels obtained by interpolation can be used as pixels in the sense of the present application.

A position marker of a measured-value block in the sense of the present application is understood as a value which unequivocally defines the position of a measured-value block on the x axis of a spectrum. In this connection such a position marker can be stated as a wavelength, frequency or energy of the irradiation or also as a pixel number. In each case the first pixel number or the last pixel number or the pixel number of the middle of the measured-value block can be used as a position marker.

A measured-value block of the calibration spectrum corresponding to a measured-value block of the model spectrum is understood in the sense of the present application as the range of the calibration spectrum which, due to its position (position marker) and typically also its size, corresponds to a measured-value block of the model spectrum that is present in the memory of the secondary spectrometer. For this purpose the known position marker of the measured-value block of the model spectrum is firstly transferred to the calibration spectrum and starting from this position definition, a measured-value block which is essentially identical to the measured-value block of the model spectrum with regard to its position relative to the position marker and typically also with regard to its data content (number of value pairs), is cut out of the calibration spectrum. If, for example, a measured-value block present in the memory of the secondary spectrometer is defined by the position marker pixel 104 and the data content (position marker +9 subsequent pixels), i.e., it comprises the position marker 104 and 10 value pairs each consisting of the pixel number and associated intensity value, then the corresponding measured-value block of the calibration spectrum can thus be determined in that a measured-value block is cut out of this spectrum which also begins at pixel number 104 and comprises this value pair and the 9 subsequent value pairs, i.e., the value pairs of pixel numbers 104-113. Instrument-related individual differences between the primary and secondary spectrometer can in this case already be taken into consideration. Thus, for example in the case of large instrument-specific differences between spectrometers, the situation could arise that on the secondary spectrometer a first wavelength assignment using a peak search method is present which for example is shifted by one pixel relative to the primary spectrometer. In such cases it is for example also possible that the measured-value blocks of the calibration spectrum and of the model spectrum are cut out one pixel displaced from one another and that this shift is taken into consideration during the exact wavelength calibration according to the method according to the invention.

A stepwise relative shift of the measured-value blocks in the sense of the present invention is understood as a method in which the two measured-value blocks are repeatedly displaced by a defined distance relative to one another. In practical terms instead of using a directly corresponding measured-value block of the calibration spectrum which is characterized by the same position marker as the corresponding measured-value block of the model spectrum, this is for example carried out by using the measured-value block of the calibration spectrum in which the position marker is displaced by a distance of one or many pixels. The shift can be to lower as well as higher pixel numbers starting at the original position marker. Thus, by repeatedly carrying out these shift steps, all possible relative shifts of the measured-value blocks can be recorded over a certain range. Thus, for example the relatively shifted measured-value blocks P102: (102/I (102), 103/I (103), 104/I (104), 105/I (105), 106/I (106), P103: (103/I (103), 104/I (104), 105/I (105), 106/I (106), 107/I (107), P104: (104/I (104), 105/I (105), 106/I (106), 107/I (107), 108/I (108), P105: (105/I (105), 106/I (106), 107/I (107), 108/I (108), 109/I (109) and P106: (106/I (106), 107/I (107), 108/I (108), 109/I (109), 110/I (110) of the calibration spectrum can be successively obtained for a measured-value block of the model spectrum with a position marker 104 and 5 value pairs (e.g., represented by P104: (104/I (104), 105/I (105), 106/I (106), 107/I (107), 108/I (108)) by a stepwise relative shift of the measured-value blocks by in each case two pixels to the left and right.

A correlation value is understood in the sense of the present application as a value which serves as a measure for the agreement between the intensity values of the respective measured-value blocks of the model spectrum and calibration spectrum under consideration. In order to quantify the agreement or correlation, it is possible to use especially correlation coefficients as well as in principle other methods such as transinformation and the Kullback-Leibler divergency and also non-parametric test methods, e.g., the Spearman rank correlation coefficient or the Kendall rank correlation. The correlation coefficient used most frequently in practice is the correlation coefficient according to Pearson which is a dimensionless measure for the degree of linear correlation between the two at least interval-scaled value pair blocks. It can adopt a value between −1 and 1 where at a value of +1 (or −1) there is a complete positive (or negative) linear relationship between the observed blocks of measured values. If the correlation coefficient has the value 0, there is absolutely no linear dependency between the two blocks of measured values. A mathematical method the so-called cross-correlation, comprises two functions: the automatic shifting of the measured-value blocks relative to one another and the simultaneous calculation of the correlation values. Therefore the use of cross correlation is particularly advantageous in the method according to the invention.

A shift value is understood in the sense of the present application as a value which specifies at which relative shift of the corresponding measured-value blocks of the model spectrum and calibration spectrum there is the best agreement between the intensity values, i.e., at which relative shift of the corresponding measured-value blocks there is an optimum of the correlation value. The optimum of the correlation value can be a maximum or minimum depending on the type of correlation and choice of quantitative determination of the correlation value. In this case the shift value can be in the form of a difference value (optimal correlation of the measured-value blocks at a shift of $\Delta x$ pixels to the right or left: shift value=+$\Delta x$ or −$\Delta x$) or absolute value (optimal correlation of the measured-value blocks with the position marker x at a shift of $\Delta x$ pixels to the right or left: shift value=x+$\Delta x$ or x−$\Delta x$). For example if an optimal correlation occurs when the measured-value block of the calibration spectrum is shifted by 2 pixels to the right relative to the corresponding measured-value block of the model spectrum which has the position marker pixel 32, the shift value can be stated in the form of a difference value +2 or of an absolute value 34 (position marker pixel 32+relative shift of +2 pixels).

A value pair consisting of a position marker of the measured-value block of the model spectrum and the shift value determined in this manner thus assigns a shift value to each observed measured-value block of the model spectrum which specifies the relative shift of the two measured-value blocks at which the best correlation between the measured-value blocks is present. Such a value pair would for example for the previous example adopt the values (32/+2) (when using the difference value as the shift value) or (32/34) (when using the absolute value as the shift value).

Fitting is generally understood in the sense of the present application as mathematical optimization methods for determining the best fitting parameters or coefficients of a given assignment function for a series of value pairs. The term generally encompasses all mathematical methods for curve fitting calculations. The aim of such a curve fitting calculation is the best possible fit of the function to the data. In this case a fitting according to the least squares method (or alternatively according to another error assessment function, e.g., minimization of absolute errors) is frequently used. In this case the coefficients of the function are determined such that the sum of the squares of the deviations of all value pairs is minimized and thus there is the best possible agreement between the values and function. If for example a polynomial function of the $3^{rd}$ degree in the form of the equation $y=a_0+a_1 x+a_2 x^2+a_3 x^3$ is selected as a fitting function, the coefficients $a_0, a_1, a_2$ and $a_3$ are determined by these optimization methods such that the curve of this function fits as closely as possible to the value pairs.

The procedure for carrying out the individual steps of the methods according to the invention are elucidated in more detail in the following and other optional, alternative and/or advantageous process steps are also mentioned.

Suitable light sources for generating the model and/or calibration spectrum are in principle all light sources which have a strongly differentiated course over the largest possible spectral range and moreover exhibit minor spectral changes over lime. Spectral lamps and in particular neon, argon or mercury spectral lamps, combinations of broad-band light sources and in particular a halogen light source with filters and in particular rare earth metal filters or combinations of several wavelength-stabilized lasers or LEDs can be used as particularly suitable light sources for carrying out the method according to the invention. Rare earth metal filters are optical glass filters to which chemical elements belonging to the group of rare earth metals or compounds thereof (e.g., holmium oxide or didymium (mixture of neodymium and praseodymium) have been added. As a result these optical filters have specific filter characteristics (band-pass properties) and are characterized by temperature independence and optical long-term stability.

The model spectrum used according to the invention can typically he obtained by using several intensity spectra which have been measured with several light sources of the same constructional type, several detection units of the same constructional type or several spectrometers of the same constructional type. This is especially advantageous when one and the same model spectrum is used to calibrate the wavelengths of many secondary spectrometers of the same type because as a result individual differences of individual spectra that have been determined as reference spectra are compensated in order to thus obtain a more robust model spectrum. Thus, in particular, it is possible to take into account individual differences of the light sources, the detection units and/or the entire optical system of the spectrometers when determining a model spectrum.

In a typical embodiment of the invention the calibration spectrum is determined on the secondary spectrometer using as far as possible the same integration times, the same measurement repeat numbers and/or the same optical conditions as for the determination of the model spectrum on the primary spectrometer. As a result the calibration spectrum is determined under as far as possible the same boundary conditions as the model spectrum serving as the reference so that the spectra should not have any additional differences due to the different measuring conditions. This allows the exactest possible wavelength calibration.

The number of value pairs and thus the size of the individual measured-value blocks of the model spectrum which are present in the memory of the secondary spectrometer can be different. Thus, for example, measured-value blocks of a relatively small size can be used in spectral ranges which have a differentiated intensity course such as a clearly pronounced peak, whereas measured-value blocks of a larger size are typically used in spectral ranges which have a less differentiated intensity course such as gently increasing spectral shoulders. The individual measured-value blocks of the model spectrum can also partially overlap and a smaller measured-value block can lie entirely within a larger measured-value block. The minimum number of value pairs of a measured-value block is two value pairs, the maximum number of value pairs is determined by the resolution of the spectrometer or of its detection unit where, however, intermediate values can additionally be determined by interpolation methods which can increase the number of value pairs. Furthermore, the number of value pairs of corresponding measured-value blocks of the calibration spectrum and model spectrum can be different due to different interpolated virtual intermediate value pairs. Thus, in particular, the measured-value block of the model spectrum can comprise interpolated intermediate value pairs to increase the calibration accuracy whereas the corresponding measured-value block of the calibration spectrum may consist only of the real value pairs. Furthermore, the margins of the measured-value blocks can be shortened by a certain number of value pairs in order to carry out certain correlation methods.

The selection of the measured-value blocks is typically adapted to the spectral course of the model spectrum. From this total spectrum a person skilled in the art would typically select those regions as measured-value blocks which have a sufficiently differentiated course in this partial region of the spectrum. These regions of the model spectrum are advantageously those which exhibit large differences in intensity or low noise or less scattered light. Examples of suitable measured-value blocks are spectral regions which have one or more peaks, one or more absorption gaps, specific absorption or emission lines or characteristic intensity patterns (shoulders, bends, jumps . . . ).

In one embodiment of the method according to the invention the measured-value blocks of the model spectrum are deposited directly in the memory of the secondary spectrometer and are available there for each measured-value block in the form of a position marker of the measured-value block and in each case at least two value pairs. This manner of depositing measured-value blocks can be typically used when relatively few and non-overlapping measured-value blocks are present.

In an alternative embodiment of the method according to the invention the individual measured-value blocks of the model spectrum are not themselves deposited in the memory of the secondary spectrometer but rather instead the entire model spectrum is deposited or at least those parts of the model spectrum from which measured-value blocks can be cut out. In addition to these spectral regions, information on the individual measured-value blocks must be present in the memory of the secondary spectrometer. This information must at least comprise the position (e.g., position marker of the measured-value block) and size (number of value pairs and their position relative to the position marker) of the respective measured-value blocks. This information can be used to determine the respective measured-value blocks from the model spectrum deposited in the secondary spectrometer either before the method according to the invention is carried out in the secondary spectrometer or while it is being carried out. This type of measured-value block determination can be typically used when many overlapping measured-value blocks are present because they do not then have to be stored individually which saves memory space. In addition, other or additionally measured-value blocks can be used in a simple manner with this method even during operation. In this embodiment a deposition of the position and size of the new measured-value blocks on the secondary spectrometer is sufficient without having to record new extensive spectral data.

In a typical embodiment of the methods according to the invention the value pairs of the measured-value blocks of the model spectrum also consist of additional virtual value pairs in the form of interpolated pixel values and intensity values in addition to the real value pairs which were determined directly when determining the model spectrum on the primary spectrometer. These virtual value pairs are also present in the memory of the secondary spectrometer and are taken into account when carrying out the method. Since the model spectrum recorded on the primary spectrometer only has a limited number of measured values (i.e., real pixels) due to the detector, such additional virtual value pairs can increase the size of the measured-value block which can considerably increase the accuracy of a wavelength calibration on the basis of the statistical methods that are used.

In a typical embodiment of the methods according to the invention the method of cross-correlation analysis is used to determine a correlation value between the corresponding measured-value blocks of the model spectrum and calibration spectrum that are shifted relative to one another. In a particularly typical embodiment a cross-correlation method with mean correction and standardization is used. A cross-correlation function describes the correlation between two functions shifted relative to one another where each correlation value obtained in this manner relates to a certain relative shift of the spectra relative to one another. In the signal analysis a cross-correlation function according to FIG. 2 is used to describe the correlation between two signals at different time shifts $\tau$ between the two signals. According to the invention an analogous cross-correlation function can be used to determine the wavelength shift between the corresponding measured-value blocks of the model and calibration spectra.

In order that the invention may be more readily understood, reference is made to the following examples, which are intended to illustrate the invention, but not limit the scope thereof.

EXAMPLES

Example 1

Example 1 describes a specific embodiment of a method according to the invention analogous to the third typical embodiment.

A wavelength calibration is carried out according to the inventive method on a grating spectrometer designated CP20 from the JobinYvon Company (Longjumeau Cedex, France). This spectrometer has a linear line sensor with 256 pixels, can resolve a wavelength range of 638 to 1038 nm, and has a spectral bandwidth of about 8 nm.

A first CP20 spectrometer is defined as the primary spectrometer, and another CP20 spectrometer of the same type is defined as the secondary spectrometer. A first wavelength assignment which was carried out in the factory by the manufacturer using a conventional peak search method was available for both spectrometers and enclosed with the spectrometers. In the specific case the wavelength assignment is a polynomial of the $3^{rd}$ degree ($\lambda=a_0+a_1 x+a_2 x^2+a_3 x^3$) and the four coefficients $a_0$, $a_1$, $a_2$ and $a_3$ for the wavelength assignment were supplied with each spectrometer.

The primary spectrometer was connected by a light guide to a lamp housing in which a neon lamp was located. The intensity spectrum is measured with two different integration times because the peaks in the longer wavelength range of the spectrum have small intensities. Thus, the intensity values of pixels 1 to 75 are determined with short integration times of 330 ms and the intensity values of pixels 76 to 256 are determined with long integration times of 8000 ms. The calibration spectrum was measured with the secondary spectrometer using the same set-up and under as far as possible identical conditions.

In order to obtain the model spectrum, the real value pairs of the spectrum recorded with the primary spectrometer are interpolated. A method using splines was chosen for this. The interpolation is used to calculate additional virtual value pairs. In each case 99 intermediate value pairs were calculated between 2 pixels. Thus, a model spectrum comprising 25501 value pairs resulted from the original measurement with 256 value pairs.

Figure 3:
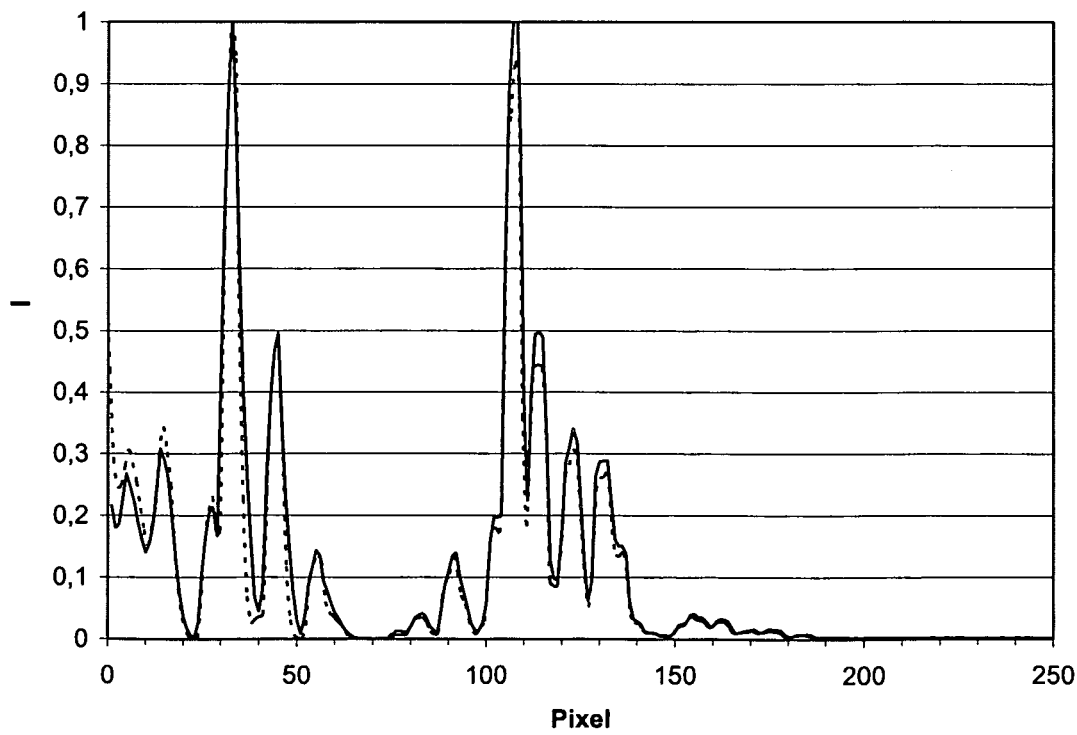
FIG. 3 shows two spectra determined by a method in accordance with an embodiment of the present invention.

FIG. 3 shows two spectra determined in this manner. The respective pixel number is plotted on the x axis, the intensity I (in relative units) normalized to the maximum value is plotted on the y axis. The spectrum shown by a continuous line represents the model spectrum obtained with the primary spectrometer, the spectrum shown with a dashed line represents the calibration spectrum obtained with the secondary spectrometer. Shifts in the wavelength assignment can be seen especially in the regions around pixel numbers 5-12 and 35-50 despite the spectrometers being of the same make. As shown in FIG. 3 the curves have a relatively undifferentiated intensity course in certain spectral ranges. There are only slight differences in intensity in the form of fewer and very small peaks in the regions of pixel numbers 68-74 and 144-250. Hence, the pixel number ranges 1-67 and 75-143 are used to determine measured-value blocks because these regions have a sufficiently differentiated intensity course for the method according to the invention. A total of 30 measured-value blocks in each case consisting of 32 pixel numbers (plus the additional interpolated intermediate value pairs) which overlap in each case by 30 pixel numbers are selected from the model spectrum. A pixel number is assigned to each measured-value block as a position marker which corresponds to the pixel number of the pixel located in the middle of the respective measured-value block. Subsequently, the corresponding measured-value blocks are cut out of the calibration spectrum and the model spectrum where the measured-value blocks of the calibration spectrum are additionally shortened by 2 pixel numbers in each case on the left and right. As a result it is possible to calculate a maximum wavelength shift of +2 to −2 pixels. Each measured-value block cut out of the calibration spectrum thus consists of 28 value pairs and each measured-value block cut out of the model spectrum consists of 32 value pairs plus all interpolated intermediate value pairs, i.e., of 3101 value pairs.

In order to determine the wavelength shift between the measured-value blocks of the model spectrum and of the calibration spectrum, a cross-correlation is carried out with mean correction and normalization. In this case a measured-value block of the calibration spectrum is shifted stepwise over the corresponding measured-value block of the model spectrum. Each step of the shift is as large as the (virtual) resolution of the model spectrum, i.e., one hundredth of the real pixel spacing. An empirical correlation coefficient ($Kor_e$) according to Pearson is calculated for each step. In each case all 28 value pairs of the calibration spectrum but also only 28 value pairs of the model spectrum are used for this. For this purpose only each hundredth value pair is taken from the corresponding measured-value block of the model spectrum, i.e., in the first calculation of the correlation value, the value pairs at positions 1, 101, . . . to 2701 of the measured value block of the model spectrum are used and for the second subsequent shift the value pairs at positions 2, 102, . . . to 2702 of the measured-value block of the model spectrum are used. For the last shift the value pairs at positions 401, 501, . . . to 3101 of the measured-value block of the model spectrum are used. This results in 401 shift steps and thus an equal number of correlation values. The correlation values themselves are calculated according to the equation of FIG. 4. For $\bar{x}$ the equation according to FIG. 5 applies and for $\bar{y}$ the equation according to FIG. 6 applies where the measurement series $x_1$, $x_2$, . . . , $x_n$ corresponds to the values of a block of the model spectrum and the measurement series $y_1$, $y_2$, . . . , $y_n$ corresponds to the values of the corresponding block of the calibration spectrum.

A high correlation coefficient $Kor_e$ corresponds to a high agreement between two blocks so that in this case the optimum of the correlation values corresponds to the maximum correlation coefficient. In order to determine the shift value according to the invention, one firstly determines the relatively shifted measured-value block of the calibration spectrum at which this maximum correlation coefficient occurs. The shift value is now determined as a distance between the position marker of the measured-value block of the model spectrum and the corresponding position marker of the calibration spectrum at which this maximum correlation coefficient occurs. The shift values can be hundredths of pixel numbers due to the interpolation of the measured-value blocks of the model spectrum by 99 interpolated intermediate values which are also taken into consideration.

A value pair consisting of the position marker of the measured-value block of the model spectrum and the shift value determined in each case by the cross-correlation method described above is determined for each of the 30 measured-value blocks of the model spectrum.

These 30 value pairs serve as design points for a fitting according to the least error squares method to a polynomial of the $3^{rd}$ degree by means of which the correction coefficients $\Delta a_0$, $\Delta a_1$, $\Delta a_2$ and $\Delta a_3$ are calculated.

In the last step in the process, the correction coefficients $\Delta a_0$, $\Delta a_1$, $\Delta a_2$ and $\Delta a_3$ determined in this manner are added to the corresponding coefficients $a_0$, $a_1$, $a_2$ and $a_3$ of the first wavelength assignment so that as a result of the method according to the invention for wavelength calibration the following wavelength-calibrated wavelength assignment is present on the secondary spectrometer: $\lambda_{cal}(nm)=(a_0+\Delta a_0)+(a_1+\Delta a_1)x+(a_2+\Delta a_2)x^2+(a_3+\Delta a_3)x^3$.

Figure 7:
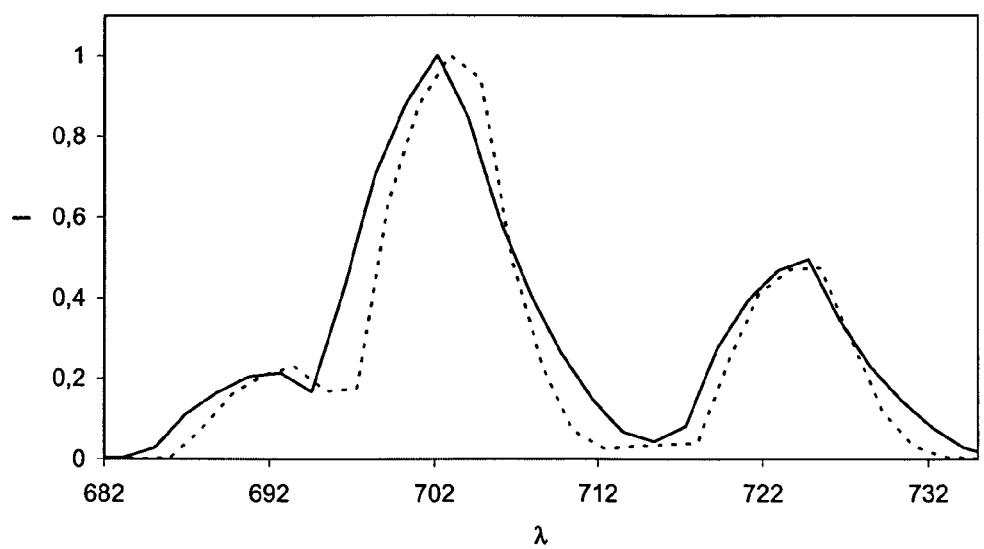
FIGS. 7 and 8 show a comparison of corresponding sections of neon spectra in accordance with an embodiment of the present invention.
Figure 8:
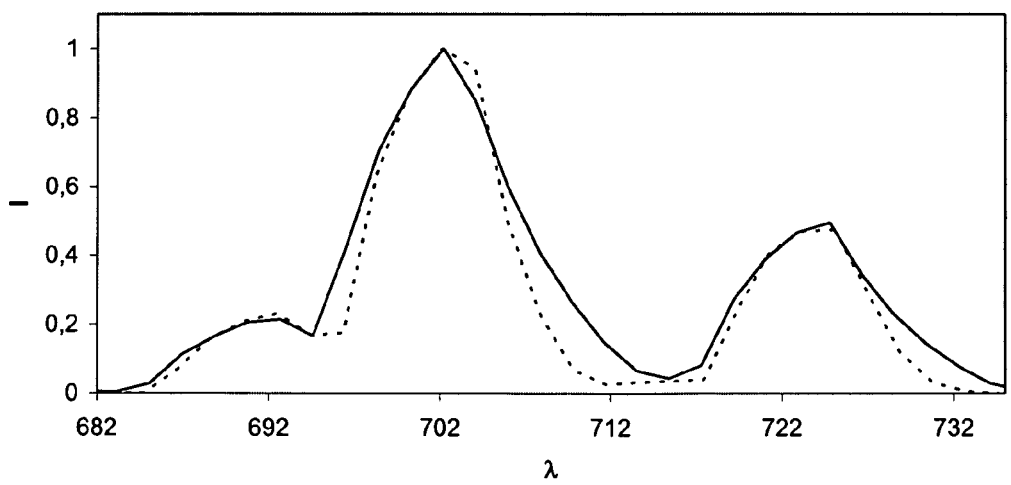

FIGS. 7 and 8 show a comparison of corresponding sections of neon spectra. In both cases a part of a model spectrum recorded with a primary spectrometer is shown by the curve drawn with a continuous line. The dashed curve in FIG. 7 represents the corresponding part of a neon spectrum which was determined by means of a secondary spectrometer which was wavelength-calibrated using a conventional peak search method. In FIG. 8 the dashed curve represents the corresponding part of a neon spectrum which was determined by means of a secondary spectrometer which was wavelength-calibrated by a method according to the invention. FIG. 7 shows that the curve of the secondary spectrometer is considerably shifted towards the right relative to the curve of the primary spectrometer. No such shift of the two curves can be seen in FIG. 8 in which the method according to the invention is used.

Example 2

In order to demonstrate and quantify the advantages of the method according to the invention compared to the previously used peak search methods, the wavelength calibration of spectrometers is simulated on a spectrum of a neon lamp in a wavelength range of 655 to 1035 nm at various calculated broadenings of the band-width. A neon spectrum is measured with a grating spectrometer of the type CP140 from the Jobin Yvon Company (Longjumeau Cedex, France) with a spectral band-width of 2 nm as a basis for the simulation. Simulated spectra with a respective bandwidth of 6, 7.5, 9 and 12 nm are calculated from this data set by a sliding multiplication using a Gauss curve adapted to each case. Wavelength calibrations are carried out on these various spectra a) with the peak search method and b) with the method according to the invention and the respective maximum errors are calculated over the entire wavelength range. These errors are listed in table 1. The errors are calculated in this case as maximum differences over the entire wavelength range between the wavelength calibrations of the spectra widened by computation and the wavelength calibration for the original spectrum. The error which is calculated for the wavelength calibration of the original spectrum is not taken into consideration.

TABLE 1

| Bandwidth [nm] | Error of peak search method [nm] | Error of the method according to the invention [nm] |
|---|---|---|
| BW 6 | 1.42 | 0.021 |
| BW 7.5 | 2.04 | 0.027 |
| BW 9 | 3.13 | 0.030 |
| BW 12 | n.a. | 0.075 |

For both wavelength calibration methods the error increases as the bandwidth increases. In the peak search method the error is between 1.42 nm at BW 6 and 3.13 nm for a spectrum with a bandwidth of 9 nm. At a bandwidth of 12 nm the peak search method can no longer be used because there are no sufficiently suitable peaks to carry it out.

In the case of the method according to the invention the error is between 0.021 at BW 6 and 0.075 at BW 12. Hence, the error in the case of the method according to the invention is many times smaller than that with the peak search method. Hence, spectrometers of a lower optical quality, i.e., with a very broad bandwidth can still also be sufficiently accurately wavelength-calibrated with this method.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method for the wavelength calibration of a spectrometer on which at least the data of two measured-value blocks of a model spectrum are present, comprising the steps:
   (a) determining the intensity spectrum of a light source on the spectrometer as a calibration spectrum,
   (b) cutting out a measured-value block from the calibration spectrum which corresponds to one of the measured-value blocks present on the spectrometer of the model spectrum,
   (c) shifting the measured-value block of the calibration spectrum in a step-wise manner relative to the measured-value block of the model spectrum and determining in each case a correlation value between the two measured-value blocks,
   (d) determining a shift value at which the correlation value reaches an optimum,
   (e) determining a value pair consisting of a position marker of the measured-value block of the model spectrum and the shift value,
   (f) repeating process steps (b) to (e) for all further measured-value blocks of the model spectrum,
   (g) fitting the value pairs obtained in process steps (b) to (f) consisting of the position marker of the respective measured-value block of the model spectrum and the associated shift value, to an assignment function to obtain the coefficients $a_0, a_1 \ldots$,
   (h) using these coefficients to determine a wavelength assignment of the spectrometer.

2. The method according to claim 1 for the wavelength calibration of a secondary spectrometer which has a linear detector array as a detection unit as well as a memory in which at least the data of two measured-value blocks of a model spectrum that was determined on a primary spectrometer as the intensity spectrum of a light source, are present, comprising the steps:
   (a) determining the intensity spectrum of a light source on the secondary spectrometer as a calibration spectrum, where the light source and detection unit used for this have a comparable type of construction to the light source and detection unit used to determine the model spectrum and the calibration spectrum is determined under comparable conditions to those used to determine the model spectrum,
   (b) cutting out a measured-value block from the calibration spectrum which corresponds to one of the measured-value blocks of the model spectrum which is present in the memory of the secondary spectrometer,
   (c) shifting the measured-value block of the calibration spectrum in a stepwise manner relative to the measured-value block of the model spectrum by in each case a single or multiple pixel value and in each case determining a correlation value between the two measured-value blocks which is a measure for the agreement between the intensity values of the two measured-value blocks,
   (d) determining a shift value as a sum of the position marker of the measured-value block and the distance between the position marker of the measured-value block of the model spectrum and the corresponding position marker of the calibration spectrum at which the correlation value reaches an optimum,
   (e) determining a value pair consisting of the position marker of the measured-value block of the model spectrum and the shift value after process step (d),
   (f) repeating process steps (b) to (e) for all further measured-value blocks of the model spectrum, (g) determining a wavelength assignment as an assignment function the coefficients of which $a_0, a_1 \ldots$ were obtained by fitting the value pairs obtained in process steps (b) to (f) consisting of a position marker of the measured-value block of the model spectrum and the associated shift value.

3. The method according to claim 1 for the wavelength calibration of a secondary spectrometer which has a linear detector array as a detection unit as well as a memory in which at least the data of two measured-value blocks of a model spectrum that were determined on a primary spectrometer as the intensity spectrum of a light source, as well as a first wavelength assignment in the form of an assignment function with the coefficients $a_0, a_1 \ldots$ are present, comprising the steps:

(a) determining the intensity spectrum of a light source on the secondary spectrometer as a calibration spectrum, where the light source and detection unit used for this have a comparable type of construction to the light source and detection unit used to determine the model spectrum and the calibration spectrum is determined under comparable conditions to those used to determine the model spectrum, (b) cutting out a measured-value block from the calibration spectrum which corresponds to one of the measured-value blocks of the model spectrum which is present in the memory of the secondary spectrometer, (c) shifting the measured-value block of the calibration spectrum in a stepwise manner relative to the measured-value block of the model spectrum by in each case a single or multiple pixel value and in each case determining a correlation value between the two measured-value blocks which is a measure for the agreement between the intensity values of the two measured-value blocks, (d) determining a shift value as a sum of the position marker of the measured-value block of the model spectrum and the distance between the position marker of the measured-value block of the model spectrum and the corresponding position marker of the calibration spectrum at which the correlation value reaches an optimum, (e) determining a value pair consisting of the position marker of the measured-value block of the model spectrum and the shift value after process step (d), (f) repeating process steps (b) to (e) for all further measured-value blocks of the model spectrum, (g) determining correction coefficients $a_0', a_1', \ldots$ by fitting the value pairs obtained in process steps (b) to (f) consisting of the position marker of the measured-value block of the model spectrum and the associated shift value, to an assignment function, (h) determining a wavelength-calibrated wavelength assignment by replacing the coefficients $a_0, a_1 \ldots$ of the first wavelength assignment by the corresponding correction coefficients $a_0', a_1' \ldots$ determined in process step (g).

4. The method according to claim 1 for the wavelength calibration of a secondary spectrometer which has a linear detector array as detection unit as well as a memory in which at least the data of two measured-value blocks of a model spectrum that were determined on a primary spectrometer as the intensity spectrum of a light source, as well as a first wavelength assignment in the form of an assignment function with the coefficients $a_0, a_1 \ldots$ are present, comprising the steps:

(a) determining the intensity spectrum of a light source on the secondary spectrometer as a calibration spectrum, where the light source and detection unit used for this have a comparable type of construction to the light source and detection unit used to determine the model spectrum and the calibration spectrum is determined under comparable conditions to those used to determine the model spectrum, (b) cutting out a measured-value block from the calibration spectrum which corresponds to one of the measured-value blocks of the model spectrum which is present in the memory of the secondary spectrometer, (c) shifting the measured-value block of the calibration spectrum in a stepwise manner relative to the measured-value block of the model spectrum by in each case a single or multiple pixel value and in each case determining a correlation value between the two measured-value blocks which is a measure for the agreement between the intensity values of the two measured-value blocks, (d) determining a shift value as the distance between the position marker of the measured-value block of the model spectrum and the corresponding position marker of the calibration spectrum at which the correlation value reaches an optimum, (e) determining a value pair consisting of the position marker of the measured-value block of the model spectrum and the shift value after process step (d), (f) repeating process steps (b) to (e) for all further measured-value blocks of the model spectrum, (g) determining correction coefficients $\Delta a_0, \Delta a_1 \ldots$ by fitting the value pairs obtained in process steps (b) to (f) consisting of a position marker of the measured-value block of the model spectrum and the associated shift value, to an assignment function, (h) determining a wavelength-calibrated wavelength assignment by combining the correction coefficients $\Delta a_0, \Delta a_1 \ldots$ determined in process step (g) with the corresponding coefficients $a_0, a_1 \ldots$ of the first wavelength assignment or by adding them thereto.

5. The method according to claim 1, wherein the assignment function is a polynomial of at least the $1^{st}$ degree.

6. The method according to claim 5, wherein the assignment function is a polynomial of the $3^{rd}$ degree.

7. The method according to claim 3, wherein a wavelength assignment is available for the primary spectrometer which is determined by known calibration methods and when the primary and secondary spectrometer have a comparable type of construction to the first wavelength assignment of the secondary spectrometer corresponds to the wavelength assignment of the primary spectrometer.

8. The method according to claim 7, wherein the wavelength assignment is available for the primary spectrometer which is determined by peak search methods.

9. The method according to claim 1, wherein the model spectrum is obtained by averaging intensity spectra which were measured with several light sources of the same constructional type, several detection units of the same constructional type, or with several spectrometers of the same constructional type.

10. The method according to claim 1, wherein the data of the measured-value blocks of the model spectrum contain, in addition to the primary value pairs consisting of pixel value and intensity value which were determined directly when determining the model spectrum, additional value pairs in the form of interpolated pixel values and intensity values which are also present in the memory of the spectrometer and are taken into consideration when carrying out the method.

11. The method according to claim 1, wherein the measured-value blocks of the model spectrum are selected from the regions of the model spectrum which have a differentiated course or a low noise or less scattered light.

12. The method according to claim 11, wherein the measured-value blocks of the model spectrum are selected from the regions of the model spectrum which exhibit large differences in intensity.

13. The method according to claim 1, wherein the light source is a spectral lamp, a combination of a broadband light source and a filter, or a combination of several wavelength-stabilized lasers.

14. The method according to claim 13, wherein the spectral lamp is a neon, argon or mercury spectral lamp.

15. The method according to claim 13, wherein the broadband light source is a halogen light source.

16. The method according to claim 13, wherein the filter is a rare earth metal filter.

17. The method according to claim 1, wherein the determination of a correlation value in process step (c) is carried out by a cross-correlation method.

18. The method according to claim 17, wherein the cross-correlation method further comprises mean value correction and normalization.

* * * * *